March 17, 1942. P. G. BIRD 2,276,560
PROCESS AND APPARATUS FOR CARRYING OUT CHEMICAL PROCESS
Filed Dec. 1, 1937 2 Sheets-Sheet 2

Patented Mar. 17, 1942

2,276,560

UNITED STATES PATENT OFFICE 2,276,560

PROCESS AND APPARATUS FOR CARRYING OUT CHEMICAL PROCESS

Paul G. Bird, Western Springs, Ill., assignor to National Aluminate Corporation, Chicago, Ill., a corporation of Delaware Application December 1, 1937, Serial No. 177,418

5 Claims. (Cl. 210—24)

The present invention relates to a process of water treatment, and more particularly to a process and apparatus for removing dissolved solids and also dissolved gases from water containing the same.

One of the objects of the present invention is to provide a process and apparatus for removing dissolved gases such as carbon dioxide and the like from water containing the same.

A still further object is a process of decreasing the dissolved solids content of water, and which produces a water which is substantially neutral or even slightly alkaline, and free of excessive amounts of dissolved acids.

A still further object is a method and apparatus for removing dissolved solids from water containing the same, and also for removing the dissolved gases originally present in said water and/or generated therein during the step of removing the aforesaid dissolved solids.

Other objects will be apparent as the invention is hereinafter more fully described.

In order to disclose the nature of my invention more clearly, reference is made to the accompanying figures of the drawings, which illustrate a preferred embodiment thereof. It is to be understood, however, that this is done solely by way of illustration and is not to be construed as a limitation upon the spirit and scope of the invention.

Figure 1:
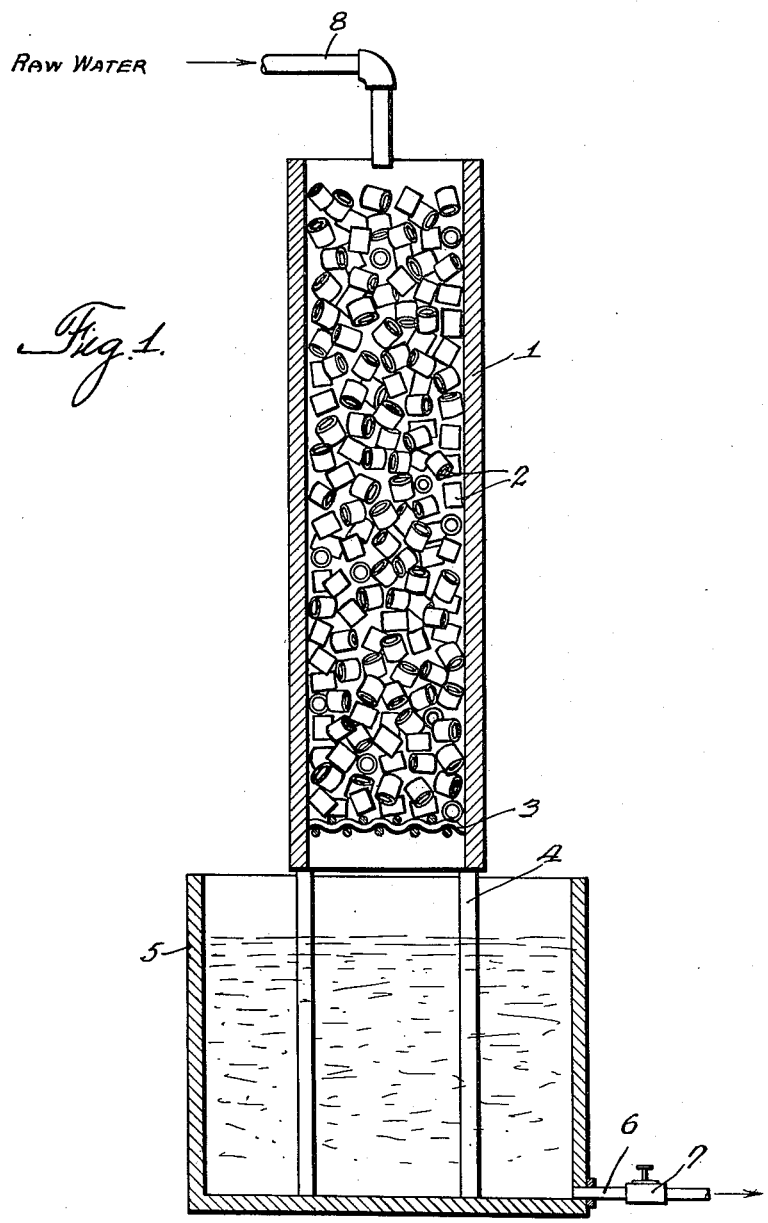
Figure 2:
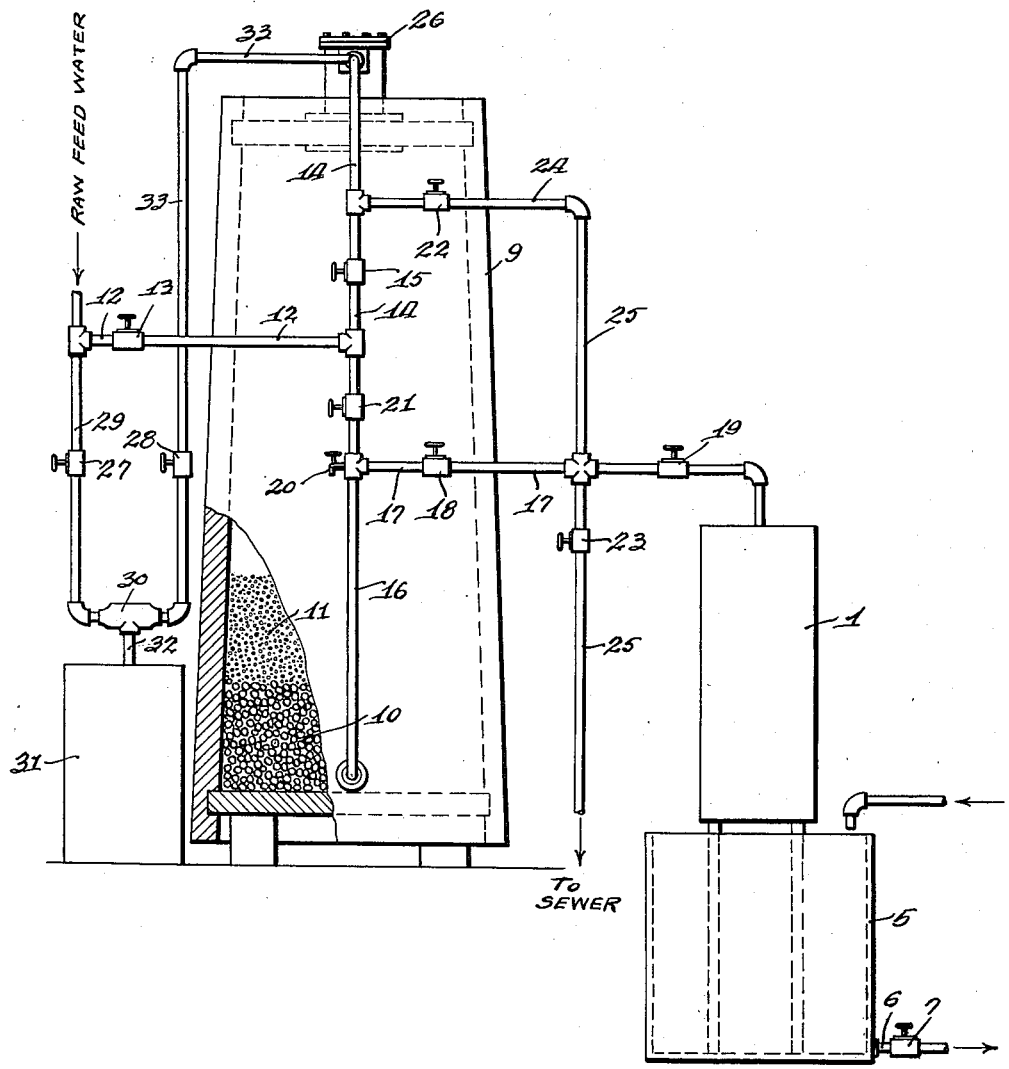

Referring generally to the drawings, Figure 1 is a sectional elevation of a suitable apparatus for removing dissolved gases from water, and Fig. 2 is an elevation, partly in section, illustrating a preferred water treating process employing the treating tank shown in Fig. 1.

Referring particularly to Fig. 1, one aspect of the present invention comprises a new and improved process and apparatus for removing dissolved gases, such as carbon dioxide and the like, from water containing the same. This particular aspect of the present invention involves an aeration process wherein the water containing free or dissolved carbon dioxide or other dissolved gases—for example, hydrogen sulfide—is aerated while in a condition of high surface exposure. This may be accomplished by introducing the water into an open, loosely packed tower 1 (Fig. 1)—for example, a cylinder filled with a material of large surface area per unit mass, such as the well known Raschig rings 2, or the like. Any other suitable filling material may be used, provided it presents a large surface and when placed in the tower results in the formation of numerous angular spaces, thereby permitting the free circulation of air through the tower. The tower is open at the top, and the Raschig rings 2 are retained in position therein by means of a foraminous structure such as an open-mesh screen 3, which is sufficiently fine to prevent the filling material from falling therethrough, but coarse enough to permit the free passage of air into the tank.

The tower is provided with suitable supporting means such as the legs 4. The water which flows from the base of the tower 1 is collected in a vessel or tank 5 placed beneath the tower 1. A conduit 6 and discharge 7 are provided to conduct the water, periodically or continuously, as desired, from the tank 5 to the place of use or storage (not shown). A supply pipe 8 is also provided for delivering the water to be treated to the top of the aeration tower.

As a specific example of the process of using the above described apparatus, water containing 6 grains of carbon dioxide per gallon of water (calculated in terms of calcium carbonate) was passed down through a bed 22 inches in depth and 6 inches in diameter, the bed being composed of standard 1-inch Raschig rings, at a rate of 5 gallons per square foot cross-sectional area of the bed. The effluent showed a maximum concentration of 0.5 grain per gallon of $CO_2$ calculated as calcium carbonate.

As a further example of the method of using the aerating tank as above described, reference is made to Fig. 2, which illustrates an apparatus for reducing the dissolved-solids content of water. The apparatus comprises an exchanger tank 9 which contains a bed 10 composed of loose, coarse, acid-resistant material such as quartz or the like, and a bed 11 of an exchange material capable of converting the ionizable dissolved-solids content of water to acids. Various materials of this character are known in the art, such as the tannin formaldehyde resin of Adams & Holmes, described in Journal of the Society of Chemical Industry, January 11, 1935, pages 1T to 6T. The apparatus also includes the aeration tank 1 of Fig. 1. The various conduits, valves, etc., of the apparatus shown in Fig. 2 can best be understood from a description of a preferred method of carrying out a process in accordance with the present invention. In the following description it is to be understood that all valves are closed unless otherwise indicated in the context.

The raw water undergoing treatment in accordance with one aspect of the present invention, flows through the horizontal raw feed line 12, the opened raw feed valve 13, and passes upwardly through the vertical feed line 14 and the opened up-flow valve 15, entering the tank at the top thereof. The water passes downwardly in the tank through the beds 11 and 10, and flows out through the discharge line 16, the transfer line 17, and the opened discharge valve 18. The effluent flows through the opened transfer valve 19 into the top of the aeration tank 1, which is similar in construction to that described with reference to Fig. 1. After passage through the aeration tower, the water is collected in the trough 5, from which it is periodically withdrawn, as hereinafter described.

The raw water is continuously passed through the apparatus in the manner described in the paragraph immediately preceding, until the water received in the trough 5 is substantially neutral. During this time, the exchange material in the exchanger tank 9 will have become substantially completely exhausted, as indicated by the fact that the effluent water (which may be withdrawn through the stop cock 20) has a content of dissolved salts substantially identical with the raw water being introduced into the exchanger tank. Usually the raw water will have a slight natural alkalinity, and in order to obtain a product water which is also substantially neutral, an additional quantity of raw water is passed through the apparatus, after the exchange material has been exhausted, until the product water is substantially neutralized by the natural alkalinity of the raw water being introduced into the exchanger, and being collected in vessel 5. If the raw water is not naturally somewhat alkaline, the passage thereof through the exchanger bed is interrupted when the bed has become exhausted, and the water in the trough 5 is neutralized in any suitable manner, as for example, by the addition of an alkaline solution thereto.

After the product water in the trough is neutral, the raw feed valve 13 is closed, the discharge valve 7 is opened and the water is withdrawn through the conduit 6 to the place of use or storage (not shown). In order to regenerate the exhausted exchange material in the exchanger tank 9, the transfer valves 18 and 19 and the up-feed valve 15 are closed. The backwash or down-feed valve 21 and the upper and lower sewer valves 22 and 23 are opened. By opening the raw feed water valve 13 the water is thereby caused to pass downwardly through the backwash or down-feed valve 21 and into the bottom of the exchanger tank 9, whence it passes upwardly through the beds 10 and 11 in a direction contrary to the normal flow of water therethrough. The water passes from the tank at the top and flows through the vertical line 14, the upper discharge line 24 and the opened upper sewer valve 22 to the sewer line 25.

After the above described backwashing operation has proceeded for a sufficient length of time to loosen the beds 10 and 11, the raw feed valve 13, the down-feed valve 21 and the upper sewer valve 22 are closed, and the transfer valve 18 is opened. The treating fluid is then introduced into the tank by opening the acid injector valves 27 and 28. The raw water then passes downwardly through the line 29 and the acid injector 30, drawing the dilute acid solution, such as 3% $H_2SO_4$, contained in the tank 31 upwardly through the acid leg 32. The acid is forced upwardly through the acid supply line 33 into the top of the exchanger. The dilute mineral acid flows downwardly through the bed of exchange material 11, passes out from the tank through the transfer lines 16 and 17, the open transfer valve 18 and thence to the sewer through the opened sewer valve 23 and sewer line 25. The acid is passed through the exchange bed in the manner described until the exchange material is substantially completely regenerated, as indicated by the fact that a pre-calculated amount of acid has been passed through the bed. The amount of acid required is equivalent to approximately 0.4 lb. of 66° Bé. $H_2SO_4$ per 1000 grains of dissolved solids treated by the bed. The acid injector valves 27 and 28 are then closed.

In order to flush the excess acid from the regenerated exchanger bed, the raw water feed valve 13 and the up-feed valve 15 are opened, the water flowing into the top of the tank, down through the exchanger bed, and out through the exhaust line to the sewer. The washing step is continued until the effluent water has an acidity chemically equivalent to that of the total ionizable solids content of the raw water undergoing treatment, less the carbonate and bicarbonate content, when determined by titrating with an alkali and using methyl orange as the indicator. The regeneration phase of the process is then completed, and the apparatus is ready for the normal or on-flow period of operation as described above.

In the foregoing detailed description of preferred embodiments of the present invention, it is apparent that many variations may be made without departing from the spirit and scope thereof. Thus, for example, any other suitable exchange material capable of removing positive ions from aqueous solutions may be used in lieu of that employed in the example. For example, the exchange material described and claimed in the co-pending application of Willard H. Kirkpatrick, Serial No. 113,986, filed December 3, 1936, may be used if desired. Moreover, other suitable packing for the aeration tower 1 may be used in place of the Raschig rings, the purpose of which is merely to assure a condition of high surface exposure and to permit a free circulation of air through the tower. The process and apparatus described in detail above are to be understood as constituting merely preferred embodiments of the present invention, and, if desired, many changes can be made whereby substantially the same results may be achieved. While the exchanger 1 is preferably a closed tank operating under a slight head of pressure, an open tank may be substituted therefor. Likewise, in the operation of the process, it may be preferred to pass the raw water either laterally or upwardly through the bed of exchange material, rather than downwardly therethrough. Furthermore, in place of the loosely packed tower, other means may be used for exposing the water in a high surface condition to the free access of air. Many other variations in detail will be apparent to those skilled in the art. I therefore intend to be limited only in accordance with the following patent claims.

I claim:

1. An apparatus for removing salts of carbonic acid from water containing the same, which comprises a treating tank containing a bed of exchange material capable of converting salts of weak volatile acids to the corresponding free acids, an open loosely packed tower open at both ends and adapted to permit the aeration of water passing therethrough in a condition of high surface exposure, a storage tank, means for introducing water into said treating tank, means for conducting the water flowing from said treating tank to the upper part of the aeration tower, means for draining the water from the aeration tower into the storage tank, means for draining the treating tank to waste, means for introducing a regenerating fluid into said treating tank, and means for introducing raw water into said treating tank in a direction contrary to the normal flow of water therethrough.

2. An apparatus for removing salts of weak volatile acid from water containing the same, which comprises, in combination, a treating vessel containing a pervious bed of exchange material capable of converting salts into acids, a tower open at both ends and in free communication with the atmosphere, filling material of large surface area per unit of mass loosely disposed within said tower and adapted to permit substantially free circulation of air through said tower, means for introducing water to be treated into said treating vessel for passage through the exchange material therein contained, and means for conducting the water after passage through said exchange material from said treating vessel to the upper part of said open tower, whereby the water, passing co-currently with freely circulating air downwardly through said tower, is substantially freed of said volatile acid.

3. An apparatus for treating water, which comprises, in combination, a treating vessel containing a pervious bed of exchange material, a tower open at both ends and in free communication with the atmosphere, filling material of large surface area per unit of mass loosely disposed within said tower and adapted to permit substantially free circulation of air through said tower, means for introducing water to be treated into said treating vessel for passage through the exchange material therein contained, means for conducting the water after passage through said exchange material from said treating vessel to the upper part of said open tower, and means for collecting the water after passage co-currently with freely circulating air downwardly through said tower.

4. A method of removing salts of weak volatile acid from water containing the same which comprises contacting said water with a body of exchange material capable of converting salts into acids, and thereafter passing the water co-currently with freely circulating air downwardly through a loosely packed pervious body of distributing material of large surface area per unit of mass in free communication with the atmosphere at the upper and lower surface of said body, whereby the water is substantially freed of said salts of weak volatile acid.

5. A method of reducing the dissolved solids content of water, which comprises contacting said water with a body of exchange material capable of converting salts into acids, thereafter passing the water co-currently with freely circulating air downwardly through a loosely packed pervious body of distributing material of large surface area per unit of mass and in free communication with the atmosphere at the upper and lower surfaces of said body whereby substantially to remove the dissolved weak volatile acid from the water, and then neutralizing the non-volatile acid content of the water after passage through said pervious body, whereby to obtain a substantially neutral product water of reduced solids content.

PAUL G. BIRD.